(12) United States Patent
Sato (10) Patent No.: US 11,489,305 B2
(45) Date of Patent: Nov. 1, 2022

(54) METHOD OF MANUFACTURING TERMINAL-ATTACHED ELECTRIC WIRE AND TERMINAL-ATTACHED ELECTRIC WIRE

(71) Applicant: Yazaki Corporation, Tokyo (JP)

(72) Inventor: Kei Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/376,449

(22) Filed: Jul. 15, 2021

(65) Prior Publication Data
US 2022/0029369 A1 Jan. 27, 2022

(30) Foreign Application Priority Data
Jul. 22, 2020 (JP) .............................. JP2020-124834

(51) Int. Cl.
H01G 7/00 (2006.01)
H01R 43/02 (2006.01)
H01R 4/02 (2006.01)
H01R 4/62 (2006.01)
B23K 26/24 (2014.01)

(52) U.S. Cl.
CPC .............. *H01R 43/02* (2013.01); *B23K 26/24* (2013.01); *H01R 4/02* (2013.01); *H01R 4/62* (2013.01)

(58) Field of Classification Search
CPC ........ H05K 1/0206; H01R 4/18; H01R 4/187; H01G 7/023
See application file for complete search history.

(56) References Cited

U.S. PATENT DOCUMENTS

| 6,758,680 | B2 * | 7/2004 | Duquerroy | H01R 24/50 |
| | | | | 439/63 |
| 6,960,093 | B1 * | 11/2005 | Fan | H01R 12/7029 |
| | | | | 439/153 |
| 9,548,545 | B2 * | 1/2017 | Yagi | H01R 4/183 |
| 2014/0144016 | A1 | 5/2014 | Bauer et al. | |
| 2015/0140873 | A1 * | 5/2015 | Ito | H01R 4/185 |
| | | | | 439/877 |
| 2016/0372881 | A1 * | 12/2016 | Bauer | B23K 26/20 |

FOREIGN PATENT DOCUMENTS

JP 2013-536552 A 9/2013
JP 6034029 B2 11/2016

* cited by examiner

*Primary Examiner* — Phuong Chi Thi Nguyen
(74) *Attorney, Agent, or Firm* — Sughrue Mion, PLLC (57) ABSTRACT

A method of manufacturing a terminal-attached electric wire includes: installing an electric wire including a core wire including a plurality of element wires to a terminal having a conductor coupling part having a pair of barrel pieces, the core wire being installed between the pair of barrel pieces; bending the pair of barrel pieces to cause the pair of barrel pieces to wrap around and cover the core wire in a circumferential direction to form a slit extending in an axial direction between the pair of barrel pieces, with respect to the circumferential direction; melting the element wires of the core wire by emitting laser light toward the core wire through the slit; and adhering the element wires melted with the laser light to the conductor coupling part.

4 Claims, 10 Drawing Sheets

METHOD OF MANUFACTURING TERMINAL-ATTACHED ELECTRIC WIRE AND TERMINAL-ATTACHED ELECTRIC WIRE

CROSS-REFERENCE TO RELATED APPLICATION(S)

The present application claims priority to and incorporates by reference the entire contents of Japanese Patent Application No. 2020-124834 filed in Japan on Jul. 22, 2020.

BACKGROUND OF THE INVENTION

1. Field of the Invention

The present invention relates to a method of manufacturing a terminal-attached electric wire and the terminal-attached electric wire.

2. Description of the Related Art

As a conventional terminal-attached electric wire, Japanese Patent No. 6034029, for example, discloses a coupling structure including a covered electric wire and a coupling terminal. The covered electric wire is configured by a conductor including a plurality of element wires covered with an insulating cover. The covered electric wire has, on its tip side, an electric wire tip part having a conductor tip part at which the insulating cover is removed from a tip side of the conductor. The coupling terminal is made of metal that is nobler than metal of which the conductor is made. The coupling terminal has an electric wire coupling allowing part having a conductor coupling allowing part that allows the conductor tip part to be coupled to. In the coupling structure, at a conductor exposed part of the electric wire tip part where the conductor tip part is exposed to at least the conductor coupling allowing part, the conductor is melted by laser to form a melting and adhesion part having the element wires bonded with each other.

By the way, a terminal-attached coupling structure described in Japanese Patent No. 6034029 described above needs to be further improved in terms of coupling between an electric wire and a terminal, for example.

SUMMARY OF THE INVENTION

In view of the issues described above, an object of the present invention is to provide a method of manufacturing a terminal-attached electric wire that enables an electric wire and a terminal to appropriately couple to each other, and the terminal-attached electric wire.

In order to solve the above mentioned problem and achieve the object, a method of manufacturing a terminal-attached electric wire according to one aspect of the present invention includes installing an electric wire including a core wire including a plurality of element wires having electrically conductive properties to a terminal having a base part extending in an axial direction along an axis line of the electric wire and a conductor coupling part having a pair of barrel pieces respectively extending, from both sides of the base part, in both sides in a circumferential direction around the axis line, the core wire being installed between the pair of barrel pieces; bending the pair of barrel pieces to cause the pair of barrel pieces to wrap around and cover the core wire in the circumferential direction to form a slit extending in the axial direction between the pair of barrel pieces, with respect to the circumferential direction; melting the element wires of the core wire by emitting laser light toward the core wire through the slit; and adhering the element wires melted with the laser light to the conductor coupling part.

According to another aspect of the present invention, in the method of manufacturing the terminal-attached electric wire, it is preferable that in the pair of barrel pieces having undergone the bending, respective tip sides are bent toward the core wire, and are in contact with the core wire to form fixing parts fixing the core wire.

According to still another aspect of the present invention, in the method of manufacturing the terminal-attached electric wire, it is preferable that the slit formed through the bending has a width in the circumferential direction, the width being equal to or narrower than an outer diameter of each of the element wires.

In order to achieve the object, a terminal-attached electric wire according to still another aspect of the present invention includes an electric wire including a core wire including a plurality of element wires having electrically conductive properties; and a terminal including a base part extending in an axial direction along an axis line of the electric wire, a pair of barrel pieces respectively extending, from both sides of the base part, in both sides in a circumferential direction around the axis line to wrap around and cover the core wire in the circumferential direction, and a conductor coupling part provided with a slit formed between the pair of barrel pieces, with respect to the circumferential direction, the slit extending in the axial direction, wherein the core wire is disposed to face the slit, and the element wires being melted have a melting and adhesion part that is a part bonded to the conductor coupling part.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment according to the present invention will now be described in detail with reference to the accompanying drawings. Note that the embodiment is not intended to limit the present invention. Note that components in the embodiment described below include ones that could be easily replaced by the skilled person or ones that are substantially the same.

Note that, in the following description, a first direction, a second direction, and a third direction intersect each other. The first direction is referred to as "axial direction X". The second direction is referred to as "width direction Y". The third direction is referred to as "height direction Z". Note herein that, the axial direction X, the width direction Y, and the height direction Z are substantially orthogonal to each other. The axial direction X typically corresponds to a direction along an axis line X1 (see FIG. 1, for example) of an electric wire to which a terminal is provided, an extending direction in which the electric wire extends, and an insertion-removal direction for the terminal and a counterpart terminal, for example. The width direction Y and the height direction Z correspond to intersecting directions intersecting the axial direction X. The height direction Z typically corresponds to a plate-thickness direction of a base part and an emission direction of laser light toward the terminal, for example. Furthermore, in the following description, a direction around the axis line X1, when the terminal is coupled to the electric wire, is referred to as a "circumferential direction D1". Furthermore, the directions used in the following description represent, unless otherwise stated, directions in a state in which parts are assembled with each other.

Embodiment

Figure 1:
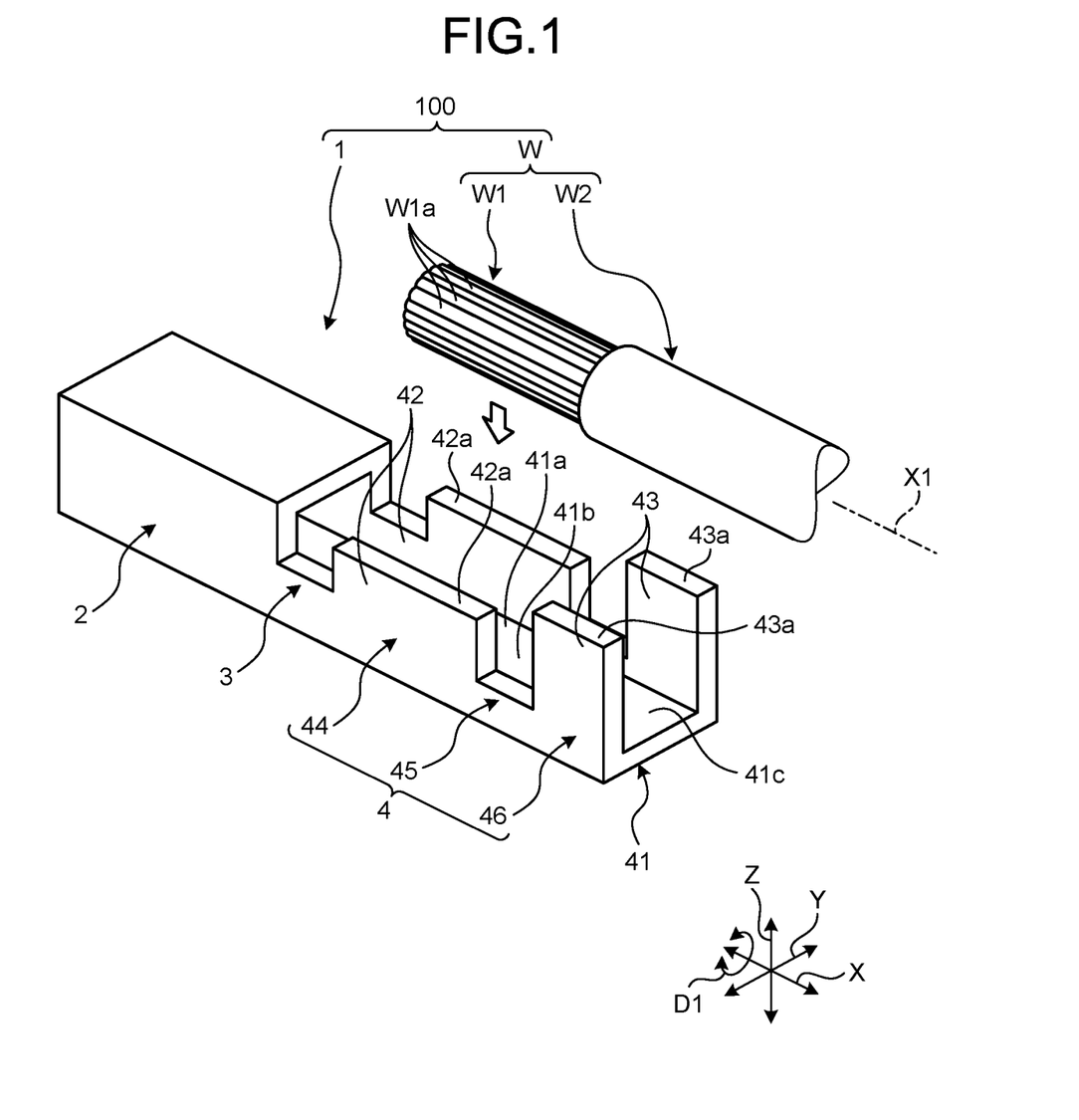
FIG. 1 is a schematic, exploded perspective view illustrating an outline configuration of a terminal-attached electric wire according to an embodiment.
Figure 2:
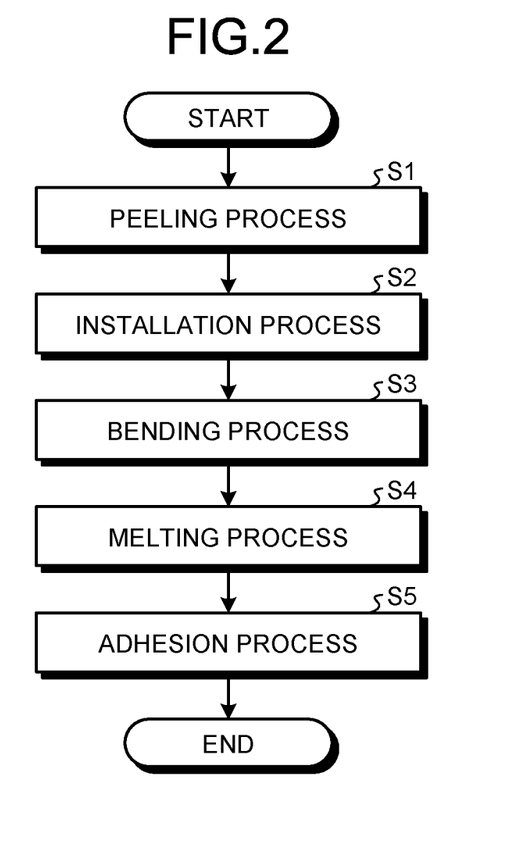
FIG. 2 is a flowchart illustrating the flow of a method of manufacturing the terminal-attached electric wire according to the embodiment.

A terminal-attached electric wire 100 according to the present embodiment, illustrated in FIG. 1, is manufactured through a method of manufacturing a terminal-attached electric wire, illustrated in FIG. 2, for example. A basic configuration of the terminal-attached electric wire 100 illustrated in FIG. 1 will first be described below. Details of the method of manufacturing the terminal-attached electric wire will then be described.

The terminal-attached electric wire 100 illustrated in FIG. 1 is applied to a wire harness used in a vehicle. Note herein that, to couple devices mounted in the vehicle to each other, for example, the wire harness serves as an assembly that has a plurality of electric wires W used for electric power supply and signal communications bundled, and that uses connectors, for example, to couple the electric wires W to the devices. The terminal-attached electric wire 100 according to the present embodiment includes the electric wire W and a terminal 1 coupled to an end of the electric wire W. FIG. 1 illustrates a state before the terminal 1 is coupled to the electric wire W. The terminal 1 according to the present embodiment is coupled to the electric wire W using laser welding, as will be described later (see FIGS. 6 to 9, for example).

The electric wire W is routed in the vehicle to electrically couple the devices to each other. The electric wire W includes a core wire W1 in the form of a wire having electrically conductive properties and an insulating cover W2 having electrically insulating properties and externally covering the core wire W1. The electric wire W is an insulated electric wire in which the insulating cover W2 covers the core wire W1.

The core wire W1 forms a conductor part including a plurality of element wires W1a having electrically conductive properties. The core wire W1 may be a core wire having the element wires W1a bundled, or a stranded core having the element wires W1a bundled and strand. The insulating cover W2 is an electric wire cover that covers an outer periphery side of the core wire W1. The insulating cover W2 is formed, for example, by extruding a resin material having electrically insulating properties (e.g., polypropylene (PP), polyvinyl chloride (PVC), or cross-linked polyethylene (PE). The material is appropriately selected by taking into account wear resistance properties, chemical resistance properties, and heat resistance properties, for example.).

The electric wire W linearly extends along the axis line X1. That is, the electric wire W is formed to extend at a substantially identical diameter across its whole length in the extending direction (the axial direction X). A cross-sectional shape (a cross-sectional shape taken along a direction intersecting the axial direction X) of the electric wire W wholly has a substantially circular shape. A cross-sectional shape of the core wire W1 has a substantially circular shape. A cross-sectional shape of the insulating cover W2 has a substantially annular shape. At at least one end of the electric wire W, the insulating cover W2 is peeled off, resulting in that the core wire W1 is exposed from the insulating cover W2. The electric wire W is provided with the terminal 1 at the end, exposed from the insulating cover W2, of the core wire W1.

The terminal 1 is a terminal metal fitting to which the electric wire W is electrically coupled, and to which a counterpart terminal having electrically conductive properties is coupled. The terminal 1 has an electrical coupling part 2, a joining part 3, and an electric wire coupling part 4. The electrical coupling part 2, the joining part 3, and the electric wire coupling part 4 are wholly and integrally made from a metal member having electrically conductive properties. For example, a sheet of a metal plate is processed through, for example, punching, pressing, bending, to three-dimensionally and integrally form parts, including the electrical coupling part 2, the joining part 3, and the electric wire coupling part 4, of the terminal 1, in accordance with the respective shapes of the parts. From one side to another side, in the axial direction X, of the terminal 1, the electrical coupling part 2, the joining part 3, and the electric wire coupling part 4 are arranged in this order and joined to each other.

The electrical coupling part 2 is a part to be electrically coupled to a counterpart terminal. The electrical coupling part 2 may have a male-type terminal shape or a female-type terminal shape. The electrical coupling part 2 according to the present embodiment is illustrated as a female-type terminal shape, and is to be electrically coupled to a counterpart terminal having a male-type terminal shape. Note that, the electrical coupling part 2 is not limited to be electrically coupled to a counterpart terminal. The electrical coupling part 2 may be electrically coupled to a member having electrically conductive properties, which varies in type, such as a grounding member. In this case, the electrical coupling part 2 may have a so-called round terminal (LA terminal) shape that is to be tightened to a grounding member, for example.

The joining part 3 is a part lying between the electrical coupling part 2 and the electric wire coupling part 4 to electrically join the electrical coupling part 2 and the electric wire coupling part 4 to each other. In the terminal 1, the electrical coupling part 2 and the electric wire coupling part 4 are electrically coupled to each other via the joining part 3. The electrical coupling part 2 and the core wire W1 of the electric wire W are then electrically coupled to each other via the electric wire coupling part 4.

The electric wire coupling part 4 is a part to be coupled to the electric wire W to electrically couple the end of the electric wire W and the terminal 1 to each other. The electric wire coupling part 4 has a base part 41 and two pairs of barrel pieces 42, 43. With the base part 41 and the two pairs of barrel pieces 42, 43, the electric wire coupling part 4 is coupled to the electric wire W.

To describe in more detail, in the electric wire coupling part 4, the base part 41 and the two pairs of barrel pieces 42, 43 form a conductor coupling part 44, an intermediate part 45, and a cover coupling part 46. In other words, the electric wire coupling part 4 has the conductor coupling part 44, the intermediate part 45, and the cover coupling part 46, which are formed by the base part 41 and the two pairs of barrel pieces 42, 43.

The conductor coupling part 44 is formed by a part of the base part 41 and the pair of barrel pieces 42. The intermediate part 45 is formed by a part of the base part 41. The cover coupling part 46 is formed by a part of the base part 41 and the pair of barrel pieces 43. From the side of the electrical coupling part 2 toward the opposite side, in the axial direction X, of the electric wire coupling part 4, the conductor coupling part 44, the intermediate part 45, and the cover coupling part 46 are arranged in this order and joined to each other. The electric wire coupling part 4 according to the present embodiment forms a so-called separate barrel type coupling part in which the pair of barrel pieces 42 and the pair of barrel pieces 43 are separated from each other by the intermediate part 45.

Specifically, the base part 41 is a part extending in the axial direction X to serve as a bottom wall of the electric wire coupling part 4. The base part 41 is formed into the shape of a plate whose plate-thickness direction coincides with the height direction Z. Before the terminal 1 is coupled to the electric wire W, the base part 41 is formed into a substantially U-shape in which its both ends in the width direction Y rise upward in the height direction Z. The base part 41 is mounted with the end of the electric wire W during coupling processing. One side, in the axial direction X, of the base part 41 is joined to the electrical coupling part 2 via the joining part 3.

More specifically, the base part 41 continuously extends in the axial direction X across the conductor coupling part 44, the intermediate part 45, and the cover coupling part 46. That is, in the base part 41, a first base part 41a forming the conductor coupling part 44, a second base part 41b forming the intermediate part 45, and a third base part 41c forming the cover coupling part 46 continue in the axial direction X. The base part 41 is joined to the electrical coupling part 2 at one end, in the axial direction X, of the first base part 41a.

The pair of barrel pieces 42 are parts forming the conductor coupling part 44 together with the first base part 41a that is a part of the base part 41. The conductor coupling part 44 is a part to be welded with laser light together with the core wire W1 of the electric wire W, as will be described later, and thus is to be electrically coupled to the core wire W1. The conductor coupling part 44 is provided on one end side, in the axial direction X, of the electric wire coupling part 4, and here, provided on the side of the electrical coupling part 2.

The pair of barrel pieces 42 are parts formed, in the conductor coupling part 44, to each rise upward from both ends, in the width direction Y, of the first base part 41a to each extend in a band shape in the height direction Z. Before the terminal 1 is coupled to the electric wire W, the pair of barrel pieces 42 each protrude to the one side in the height direction Z, from both ends, in the width direction Y, of the first base part 41a, and face each other in the width direction Y. Before the terminal 1 is coupled to the electric wire W, the pair of barrel pieces 42 serve as side walls of the conductor coupling part 44 formed into a substantially U-shape.

In the pair of barrel pieces 42 according to the present embodiment, the length from each of the bottoms on the first base part 41a side to each of tips 42a is set such that, after the terminal 1 is coupled to the electric wire W, as will be described later, the pair of barrel pieces 42 wrap around and cover the core wire W1 in the circumferential direction D1, but the tips 42a do not overlap each other to form a slit 47 between the tips 42a (see FIG. 4, for example). After the terminal 1 is coupled to the electric wire W, as will be described later, the pair of barrel pieces 42 according to the present embodiment are formed as parts each extending from the first base part 41a to both sides in the circumferential direction D1 and wrapping around and covering the core wire W1 in the circumferential direction D1 (see FIGS. 6 and 9, for example). While the first base part 41a and the pair of barrel pieces 42 externally wrap around the core wire W1 of the electric wire W disposed between the pair of barrel pieces 42, the conductor coupling part 44 is welded together with the core wire W1 with laser light L and electrically coupled to the core wire W1.

The pair of barrel pieces 43 are parts forming the cover coupling part 46 together with the third base part 41c that is a part of the base part 41. The cover coupling part 46 is a part that is to be swaged and crimped onto the insulating cover W2 of the electric wire W, and thus is to be fixed to the insulating cover W2. The cover coupling part 46 is provided on another end side, in the axial direction X, of the electric wire coupling part 4, and here, on the opposite side to the electrical coupling part 2.

The pair of barrel pieces 43 are parts formed, in the cover coupling part 46, to respectively rise upward from both ends, in the width direction Y, of the third base part 41c to each extend in a band shape in the height direction Z. Before the terminal 1 is coupled to the electric wire W, the pair of barrel pieces 43 each protrude on one side in the height direction Z, from both ends, in the width direction Y, of the third base part 41c, and face each other in the width direction Y. Before the terminal 1 is coupled to the electric wire W, the pair of barrel pieces 43 serve as side walls of the cover coupling part 46 formed into a substantially U-shape.

In the pair of barrel pieces 43 according to the present embodiment, the length from each of the bottoms on the third base part 41c side to each of tips 43a is set such that, after the pair of barrel pieces 43 wrap around, swage, and crimp the insulating cover W2, the tips 43a do not overlap each other. After the terminal 1 is coupled to the electric wire W, as will be described later, the pair of barrel pieces 43 according to the present embodiment are formed as parts each extending, in a band shape, from the third base part 41c to both sides in the circumferential direction D1, and wrapping around, swaging, and crimping the insulating cover W2 of the electric wire W with the third base part 41c (see FIG. 4, for example). While the third base part 41c and the pair of barrel pieces 43 externally wrap around the insulating cover W2 of the electric wire W disposed between the pair of barrel pieces 43, the cover coupling part 46 is swaged and crimped onto the insulating cover W2.

The pair of barrel pieces 43 according to the present embodiment are, for example, swaged and crimped, that is, round-crimped. In the round crimping, as illustrated in FIG. 4, for example, described later, the cover coupling part 46 is, while the third base part 41c and the pair of barrel pieces 43 wrap around and crimp the insulating cover W2, swaged and crimped in a positional relation in which the tips 43a of the pair of barrel pieces 43 face each other and are in contact with each other. Note that, swaging and crimping methods are not limited to the round crimping described above. The pair of barrel pieces 43 may be swaged and crimped by a method called overlap crimping. In the overlap crimping, while the third base part 41c and the pair of barrel pieces 43 wholly wrap around and press-fit the insulating cover W2 in the circumferential direction D1, the tips 43a of the cover coupling part 46 overlap each other.

Note herein that, in the electric wire coupling part 4, the intermediate part 45 lies between the cover coupling part 46 and the conductor coupling part 44 in the axial direction X. The intermediate part 45 is a part lying between the conductor coupling part 44 and the cover coupling part 46 to join the conductor coupling part 44 and the cover coupling part 46 to each other in the axial direction X. The intermediate part 45 is formed by the second base part 41b. An end on one side, in the axial direction X, of the second base part 41b is joined to the first base part 41a of the conductor coupling part 44. An end on the other side is joined to the third base part 41c of the cover coupling part 46. The intermediate part 45 forms a part at which a part of the core wire W1 is exposed from the terminal 1. As described above, with the intermediate part 45 lying between the pair of barrel pieces 42 and the pair of barrel pieces 43, the pair of barrel pieces 42 and the pair of barrel pieces 43 are formed to be separated from each other at a distance.

In the terminal-attached electric wire 100 configured as described above, the electric wire W is physically and electrically coupled to the electric wire coupling part 4. The terminal-attached electric wire 100 is then, for example, when the terminal 1 is held in a connector housing, for example, and the connector housing is fitted into and coupled with a connector housing of a counterpart connector, electrically coupled to a counterpart terminal, in the electrical coupling part 2, to form a mutual electrical contact part. As a result, the terminal-attached electric wire 100 is electrically coupled to the counterpart terminal via the coupling part.

The outline configuration of the terminal-attached electric wire 100 according to the embodiment has been described above.

Next, a method of manufacturing the terminal-attached electric wire 100 configured as described above (a method of manufacturing a terminal-attached electric wire) will now be described with reference to FIGS. 2 to 9. The following description proceeds on the basis of a flowchart in FIG. 2, with appropriately reference to other drawings.

In the following description, an operator manually performs the method of manufacturing the terminal-attached electric wire 100, by using various types of devices, apparatuses, and jigs, for example. However, how the method is performed is not limited to the way described below. For example, the method may be automatically executed with various types of manufacturing devices. The method of manufacturing the terminal-attached electric wire 100 according to the present embodiment includes a peeling process (step S1), an installation process (step S2), a bending process (step S3), a melting process (step S4), and an adhesion process (step S5).

As the peeling process, the operator first peels off the insulating cover W2, at an end of the electric wire W, to cause an end of the core wire W1 to be exposed from the insulating cover W2 (step S1).

Figure 3:
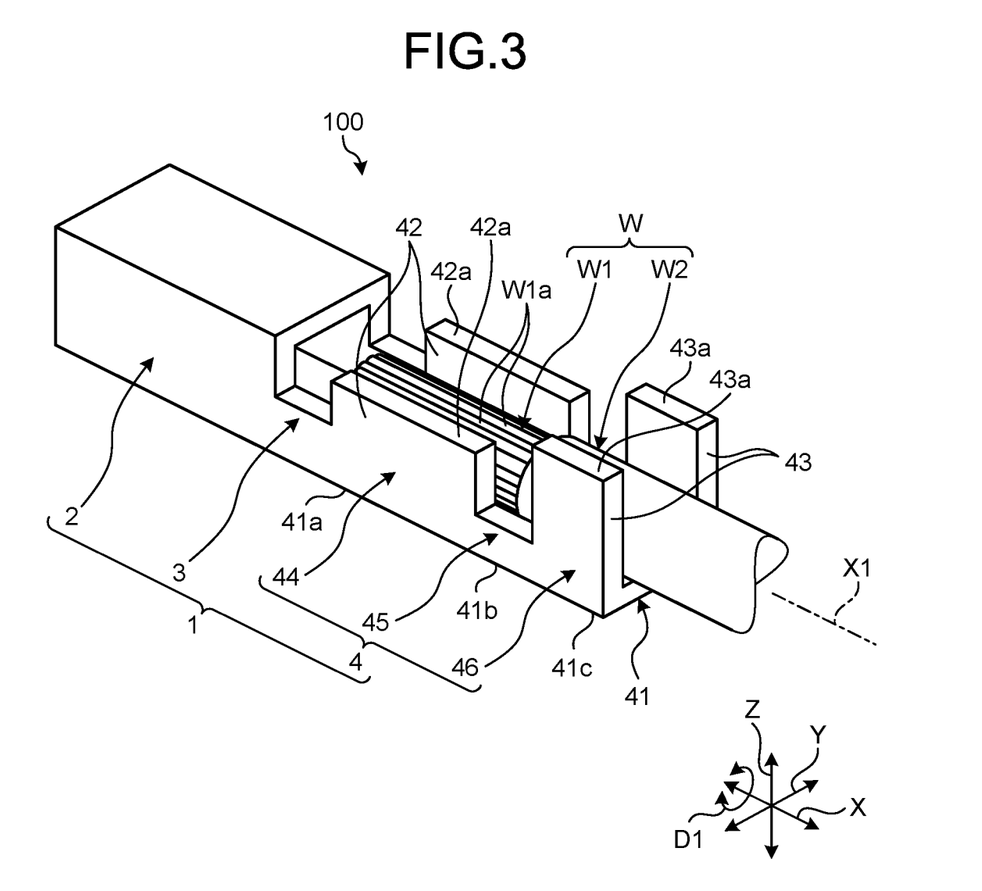
FIG. 3 is a schematic perspective view for describing the method of manufacturing the terminal-attached electric wire according to the embodiment.

Next, after the peeling process (step S1), as illustrated in FIG. 3, as the installation process, the operator installs the electric wire W that is partially peeled off, between the two pairs of barrel pieces 42, 43 in the axial direction X (step S2). At the installation process (step S2), the operator installs the core wire W1 that is exposed from the end of the insulating cover W2, between the pair of barrel pieces 42 of the conductor coupling part 44 of the terminal 1. At the installation process (step S2), the electric wire W is installed on the base part 41 to allow the core wire W1 exposed from the end of the insulating cover W2 to lie between the pair of barrel pieces 42 of the conductor coupling part 44, allow the insulating cover W2 to lie between the pair of barrel pieces 43 of the cover coupling part 46, and allow the end of the insulating cover W2 to lie on the intermediate part 45.

Figure 4:
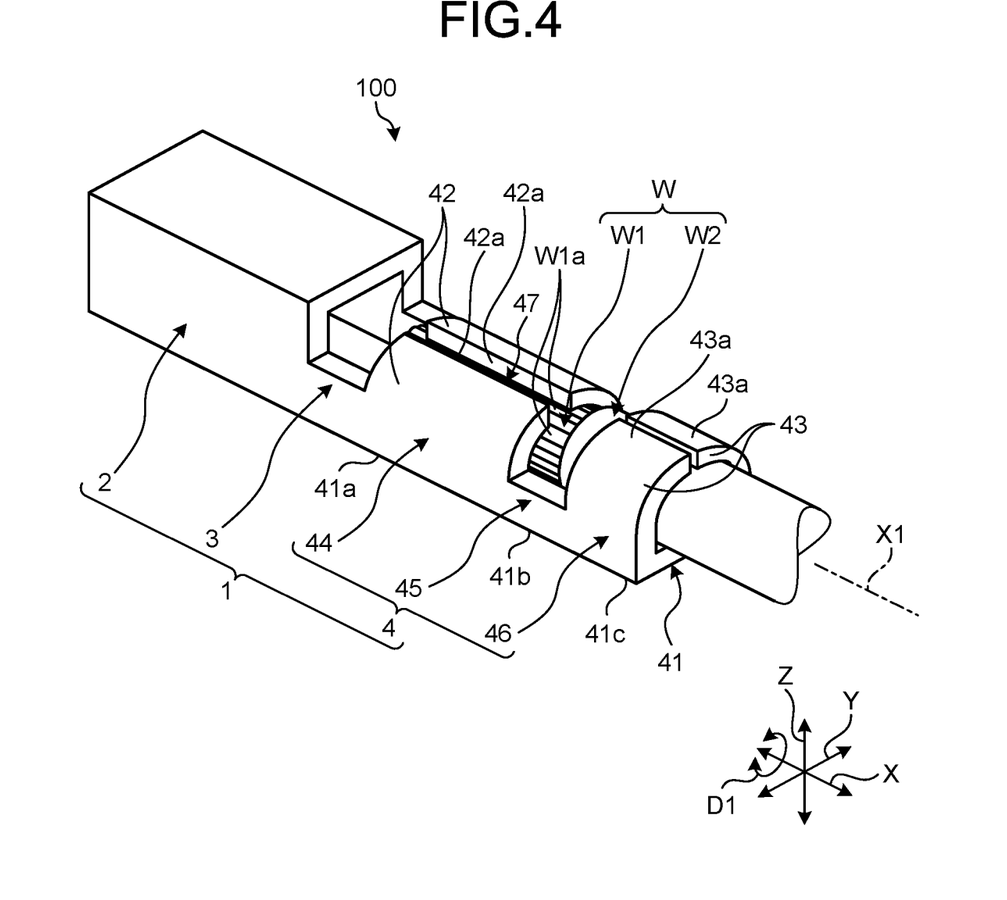
FIG. 4 is a schematic perspective view for describing the method of manufacturing the terminal-attached electric wire according to the embodiment.
Figure 5:
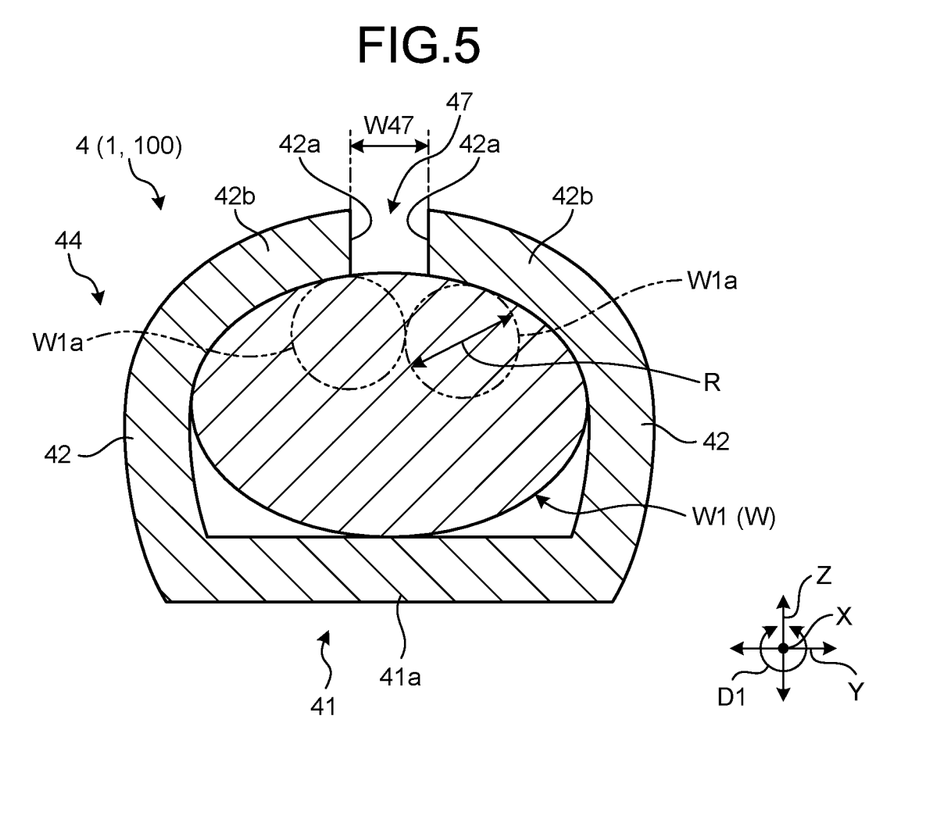
FIG. 5 is a schematic cross-sectional view for describing the method of manufacturing the terminal-attached electric wire according to the embodiment.

Next, after the installation process (step S2), as illustrated in FIGS. 4 and 5, as the bending process, the operator bends the pair of barrel pieces 42 to cause the pair of barrel pieces 42 to wrap around and cover the core wire W1 in the circumferential direction D1, and to form the slit 47 (step S3).

The slit 47 formed through the bending process (step S3) linearly extends in the axial direction X between the pair of barrel pieces 42 with respect to the circumferential direction D1. That is, the conductor coupling part 44 possessed by the terminal 1 according to the present embodiment is provided with, through the bending process (step S3), the slit 47 formed between the pair of barrel pieces 42 with respect to the circumferential direction D1 and extending in the axial direction X.

To describe in more detail, the slit 47 is formed as a space part sandwiched between the tips 42a of the pair of barrel pieces 42, with respect to the circumferential direction D1, to allow a space part on the interior side surrounded by the first base part 41a and the pair of barrel pieces 42 and a space part on the exterior side to be in communication with each other. With this configuration, the slit 47 is able to cause, in the conductor coupling part 44, a part of the core wire W1 wrapped around and covered by the first base part 41a and the pair of barrel pieces 42 to be externally exposed from between the tips 42a. The slit 47 is formed across the whole length of each of the tips 42a in the axial direction X. The slit 47 functions, at the later melting process (step S4), as a laser emitting groove through which the laser light L is directly emitted toward the core wire W1. It is preferable that the slit 47 formed through the bending process (step S3) typically has a width W47 in the circumferential direction D1 equal to or narrower than the outer diameter R of each of the element wires W1a.

Furthermore, the pair of barrel pieces 42 having undergone the bending process (step S3) each extend from the first base part 41a to both sides in the circumferential direction D1 and wrap around and cover the core wire W1 in the circumferential direction D1. The tips 42a of the pair of barrel pieces 42 then form fixing parts 42b. The fixing parts 42b function as parts that are bent toward the core wire W1, and come into contact with the core wire W1 to fix the core wire W1, on the side of the tips 42a of the pair of barrel pieces 42. The fixing parts 42b according to the present embodiment are, on the side of the tips 42a of the barrel pieces 42, formed to each bend in a curved shape along an outer periphery surface of the core wire W1, and come into contact with and are fixed to the outer periphery surface of the core wire W1. Note herein that, the fixing parts 42b are together formed into a tapered, narrowed shape, in the height direction Z, from the first base part 41a toward the slit 47.

Note that, the bending process (step S3) may also be used as a crimping process for crimping the cover coupling part 46 onto the insulating cover W2. The bending process (step S3) and the crimping process may otherwise be separate processes. For example, when the bending process (step S3) is also used as the crimping process, the operator uses a crimping machine with an anvil and a crimper, for example, to press the two pairs of barrel pieces 42, 43 toward the base part 41 and gradually and inwardly bend and deform them. The operator then causes, in the conductor coupling part 44, as described above, the first base part 41a and the pair of barrel pieces 42 to wrap around and cover the core wire W1 in the circumferential direction D1, and to form the slit 47. On the other hand, the operator causes, in the cover coupling part 46, the third base part 41c and the pair of barrel pieces 43 to wrap around and swage the insulating cover W2 therebetween to crimp the pair of barrel pieces 43 onto the insulating cover W2.

Figure 6:
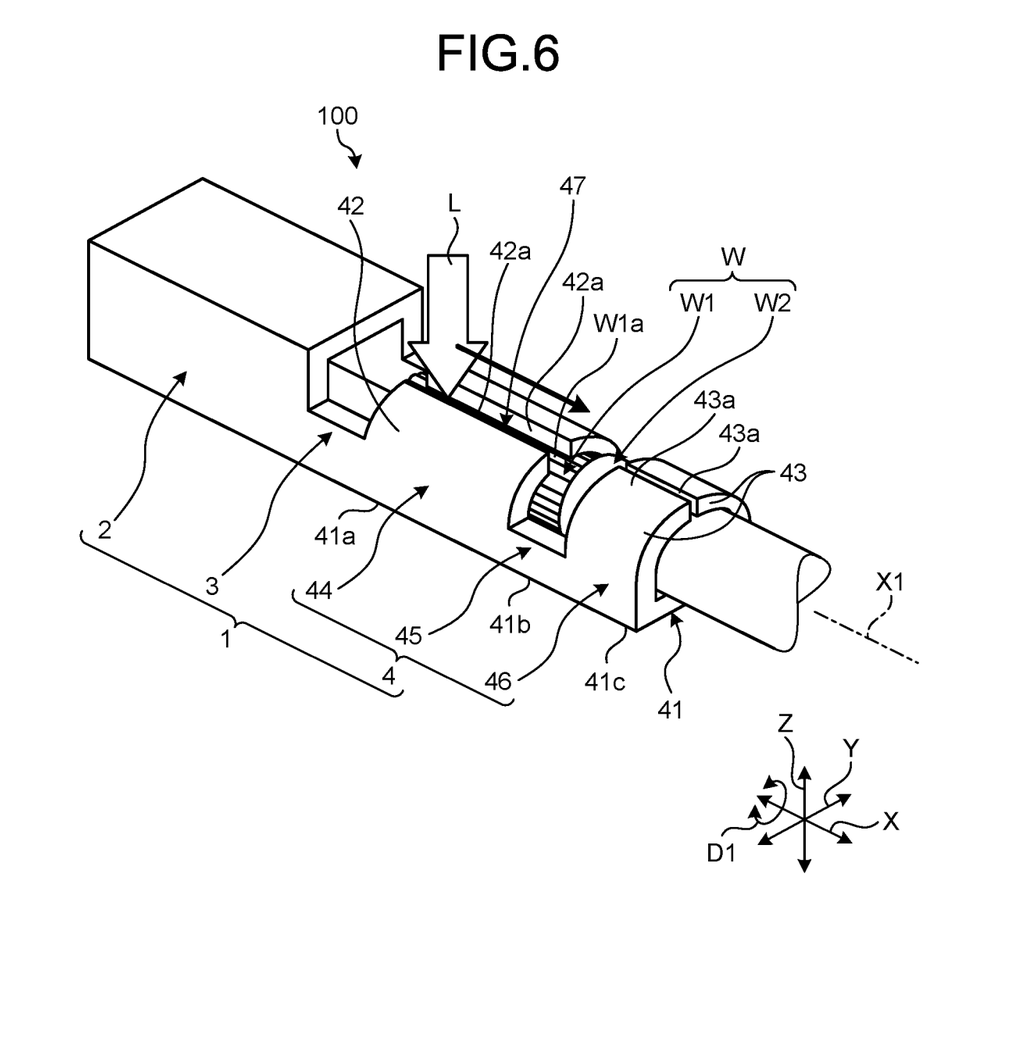
FIG. 6 is a schematic perspective view for describing the method of manufacturing the terminal-attached electric wire according to the embodiment.
Figure 7:
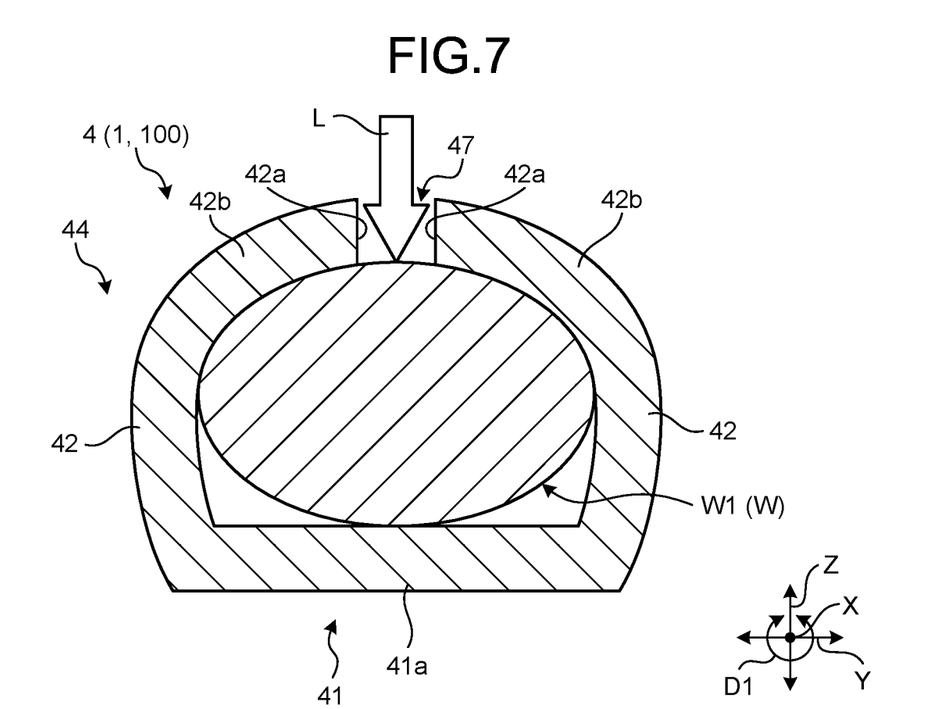
FIG. 7 is a schematic cross-sectional view for describing the method of manufacturing the terminal-attached electric wire according to the embodiment.
Figure 8:
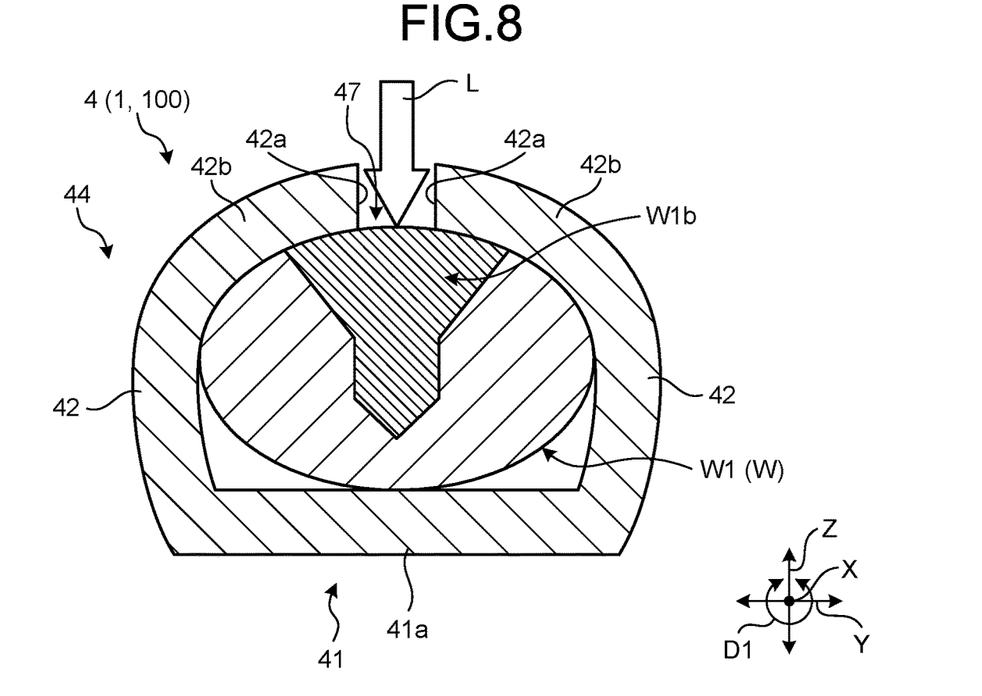
FIG. 8 is a schematic cross-sectional view for describing the method of manufacturing the terminal-attached electric wire according to the embodiment.

Next, the operator causes, after the bending process (step S3), as illustrated in FIGS. 6, 7, and 8, as the melting process, the core wire W1 to be irradiated with the laser light L through the slit 47 to melt the element wires W1a of the core wire W1 (step S4). The operator controls, at the melting process (step S4), a laser emitting device, and causes the laser emitting device to emit the laser light L to cause the laser light L to scan a whole area of the slit 47 in the axial direction X. The operator causes, for example, the laser light L to be emitted in the height direction Z from a position opposite to the slit 47 in the height direction Z. Therefore, the operator causes the laser light L to be emitted across a whole area of a part, facing the slit 47, of the core wire W1 to melt the core wire W1. Note that, in this case, it may be enough that the laser light L is at least emitted toward the core wire W1 externally exposed through the slit 47. For example, it is acceptable that the tips 42a of the pair of barrel pieces 42 are partially irradiated with the laser light L.

Figure 9:
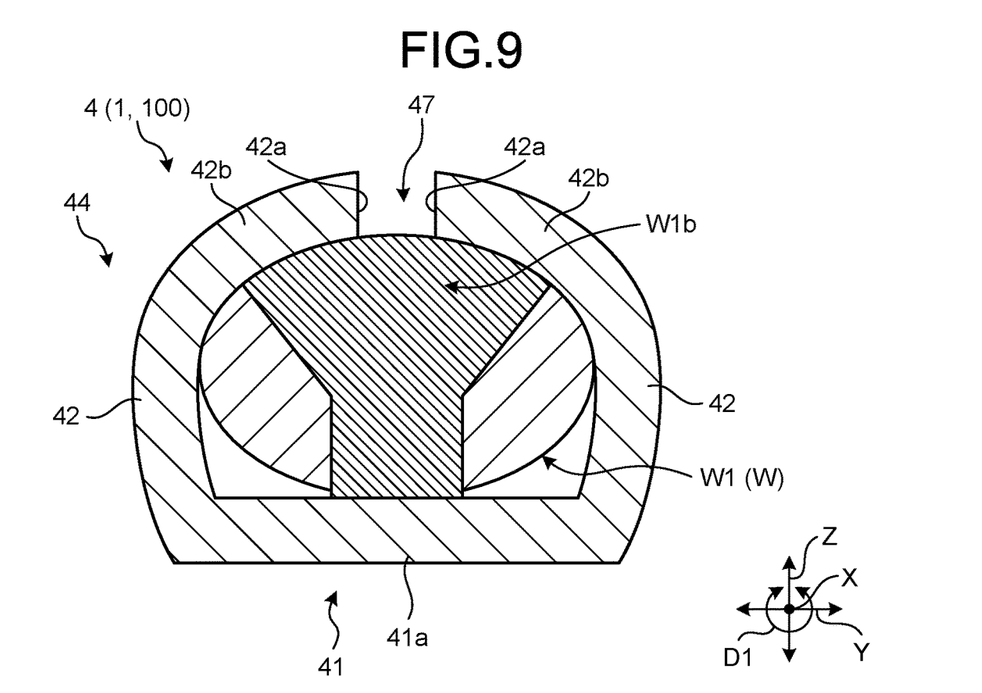
FIG. 9 is a schematic cross-sectional view for describing the method of manufacturing the terminal-attached electric wire according to the embodiment.

Next, the operator causes, after the melting process (step S4), as illustrated in FIGS. 8 and 9, as the adhesion process, the element wires W1a melted with the laser light L to be bonded to the conductor coupling part 44 (step S5). The operator controls, at the adhesion process (step S5), the laser emitting device, and causes the laser emitting device to stop the laser light L from being emitted, and causes the element wires W1a melted with the laser light L to be bonded to the conductor coupling part 44 to form a melting and adhesion part W1b.

The melting and adhesion part W1b is a part where, in the core wire W1, the element wires W1a melted with the laser light L is bonded to the conductor coupling part 44 and electrically coupled to the conductor coupling part 44. The core wire W1 is, in the melting and adhesion part W1b, electrically coupled to the conductor coupling part 44, when some or all of the element wires W1a are melted, integrated, and made into a single wire. The melting and adhesion part W1b, which is a part hardened after melted with the laser light L emitted through the slit 47, is located to face the slit 47. That is, the core wire W1 according to the present embodiment has, after the melting process (step S4) and the adhesion process (step S5), the melting and adhesion part W1b that is the part located to face the slit 47, where the element wires W1a melted with the laser light L are bonded to the conductor coupling part 44, and is electrically coupled to the conductor coupling part 44. It is possible to adjust a region of the melting and adhesion part W1b that is melted in accordance with the strength of the laser light L to be emitted toward the core wire W1 through the slit 47, and thus bonded to the conductor coupling part 44. For example, the melting and adhesion part W1b may be, as illustrated in FIG. 8, bonded and electrically coupled to the conductor coupling part 44 around the tips 42a of the pair of barrel pieces 42, or, as illustrated in FIG. 9, bonded and electrically coupled to the first base part 41a, in addition to an area around the tips 42a of the pair of barrel pieces 42. The conductor coupling part 44 of the terminal 1 and the core wire W1 of the electric wire W are integrated and electrically coupled to each other in the melting and adhesion part W1b.

With the method of manufacturing the terminal-attached electric wire 100 and the terminal-attached electric wire 100 described above, it is possible, while the pair of barrel pieces 42 wrap around and cover the core wire W1 of the electric wire W in the circumferential direction D1, to emit the laser light L toward the core wire W1 through the slit 47 formed between the pair of barrel pieces 42 to melt the element wires W1a of the core wire W1. Therefore, with the method of manufacturing the terminal-attached electric wire 100 and the terminal-attached electric wire 100, the pair of barrel pieces 42 wrapping around and covering the core wire W1 makes it possible to suppress, when the core wire W1 is irradiated with the laser light L, the element wires W1a partially and externally scattering due to the impact of the emission. That is, with the method of manufacturing the terminal-attached electric wire 100 and the terminal-attached electric wire 100, it is possible, without using a special holding jig, for example, to use, as a scattering suppression jig, the pair of barrel pieces 42 possessed by the terminal 1 itself to suppress the element wires W1a scattering when the core wire W1 is irradiated with the laser light L. With the method of manufacturing the terminal-attached electric wire 100 and the terminal-attached electric wire 100, it is then possible to cause the element wires W1a melted with the laser light L to be bonded to the conductor coupling part 44 of the terminal 1 to cause the core wire W1 and the terminal 1 to be electrically coupled to each other. As a result, with the method of manufacturing the terminal-attached electric wire 100 and the terminal-attached electric wire 100, it is possible to appropriately couple the electric wire W and the terminal 1 to each other.

Note herein that, with the method of manufacturing the terminal-attached electric wire 100 and the terminal-attached electric wire 100 described above, the tips 42a of the pair of barrel pieces 42 having undergone the bending process (step S3) are bent toward the core wire W1, and come into contact with the core wire W1 to form the fixing parts 42b fixing the core wire W1. With this configuration, with the method of manufacturing the terminal-attached electric wire 100 and the terminal-attached electric wire 100, it is possible, while the pair of barrel pieces 42 wrap around and cover the core wire W1, to cause the fixing parts 42b to securely fix the core wire W1. In this state, it is possible to perform the melting process (step S4) and the adhesion process (step S5). As a result, with the method of manufacturing the terminal-attached electric wire 100 and the terminal-attached electric wire 100, it is possible to appropriately couple the electric wire W and the terminal 1 to each other, as described above.

Furthermore, with the method of manufacturing the terminal-attached electric wire 100 and the terminal-attached electric wire 100 described above, it is preferable that the width W47, in the circumferential direction D1, of the slit 47 formed through the bending process (step S3) is equal to or narrower than the outer diameter R of each of the element wires W1a. In this case, with the method of manufacturing the terminal-attached electric wire 100 and the terminal-attached electric wire 100, it is possible, with the width W47 of the slit 47 that is equal to or narrower than the outer diameter R of each of the element wires W1a, to prevent the element wires W1a that may scatter due to the impact when the laser light L is emitted from passing through the slit 47. It is thus possible to securely suppress the element wires W1a scattering. As a result, with the method of manufacturing the terminal-attached electric wire 100 and the terminal-attached electric wire 100, it is possible to more appropriately couple the electric wire W and the terminal 1 to each other, as described above.

Note that the method of manufacturing the terminal-attached electric wire and the terminal-attached electric wire according to the embodiment of the present invention described above, are not limited to the embodiment described above, but may be modified within the scope described in the claims.

In the above description, the slit 47 is formed across the whole length of each of the tips 42a in the axial direction X. However, the present invention is not limited to the configuration described above.

Figure 10:
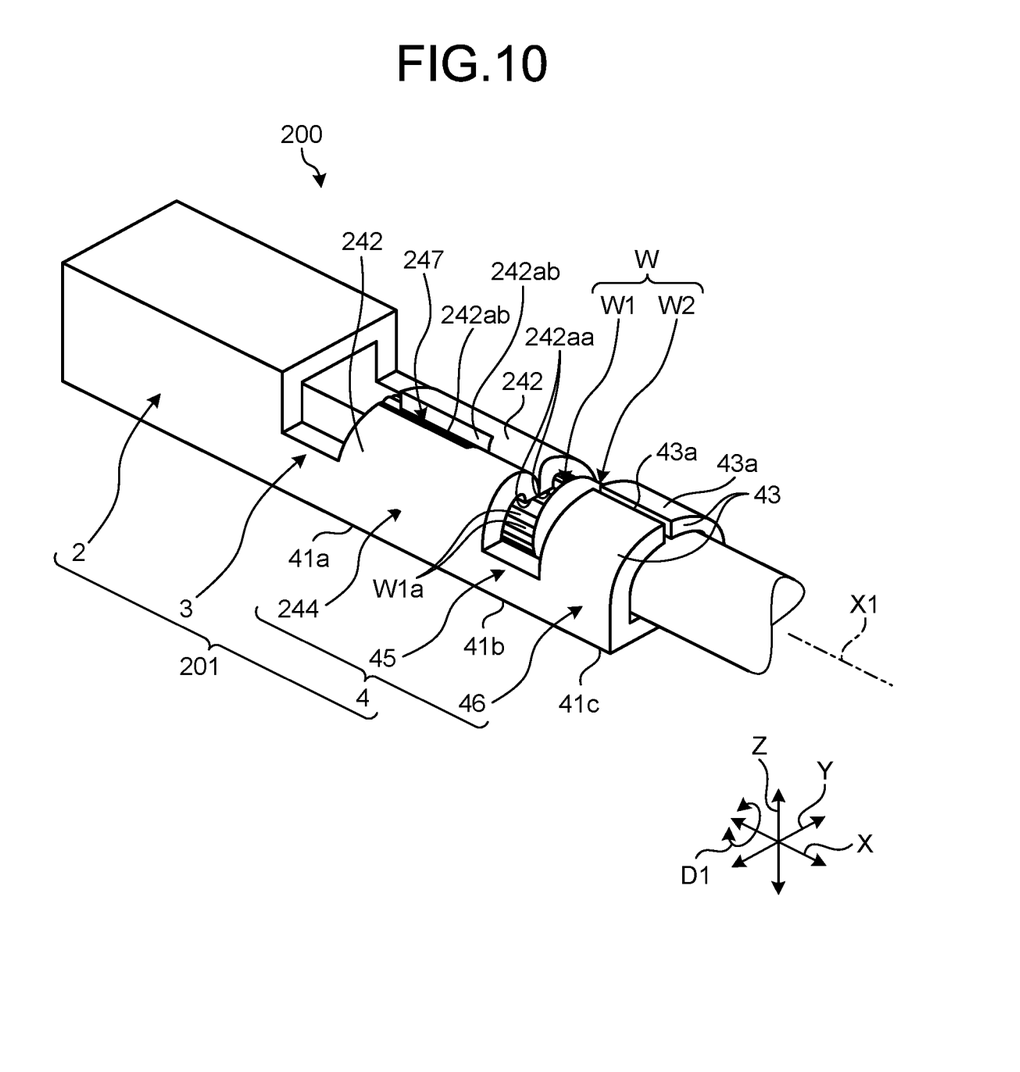
FIG. 10 is a schematic perspective view for describing a method of manufacturing a terminal-attached electric wire according to a modification example.

A terminal-attached electric wire 200 according to a modification example illustrated in FIG. 10 differs from the terminal-attached electric wire 100 described above, in that a terminal 201 is provided, instead of the terminal 1. The terminal 201 differs from the terminal 1 described above, in that a conductor coupling part 244 is included, instead of the conductor coupling part 44. The conductor coupling part 244 differs from the conductor coupling part 44 described above, in that a pair of barrel pieces 242 are included, instead of the pair of barrel pieces 42. Other configurations of the terminal-attached electric wire 200, the terminal 201, and the conductor coupling part 244 are substantially similar to the configurations of the terminal-attached electric wire 100, the terminal 1, and the conductor coupling part 44 described above.

In the pair of barrel pieces 242 according to the modification example, ends on the side of the intermediate part 45 are swaged and crimped, that is, so-called B-crimped. In addition, ends on the side of the joining part 3 form a slit 247. In the pair of barrel pieces 242, the length, at the ends on the side of the intermediate part 45, from each of the bottoms on the side of the first base part 41a to each of tips 242aa, is set relatively longer. The length, at the ends on the side of the joining part 3, from each of the bottoms on the side of the first base part 41a to each of tips 242ab, is set relatively shorter.

At the B-crimped part, on the side of the intermediate part 45, of the conductor coupling part 244, while the first base part 41a and the pair of barrel pieces 242 wholly wrap around and crimp the core wire W1 in the circumferential direction D1, the ends, on the side of the intermediate part 45, of the pair of barrel pieces 242 are each bent toward the first base part 41a. In the conductor coupling part 244, the tips 242aa of the pair of barrel pieces 242 are then swaged and crimped so as to each come into contact with and be pressed against the core wire W1 in this state.

On the other hand, in the conductor coupling part 244, while the first base part 41a and the pair of barrel pieces 242 wholly wrap around and crimp the core wire W1 in the circumferential direction D1, the tips 242ab of the pair of barrel pieces 242 lie at a distance in the circumferential direction D1 to form the slit 247. The slit 247 is formed, at the ends, on the side of the joining part 3, of the pair of barrel pieces 242, as a space part sandwiched between the tips 242ab with respect to the circumferential direction D1, to allow a space part on the interior side surrounded by the first base part 41a and the pair of barrel pieces 242 and a space part on the exterior side to be in communication with each other.

In this case, the operator bends, at the bending process (step S3), the pair of barrel pieces 242 to cause the pair of barrel pieces 242 to wrap around and cover the core wire W1 in the circumferential direction D1, to form a B-crimped part at the ends on the side of the intermediate part 45, and to form the slit 247 at the ends on the side of the joining part 3. The operator then causes, at the melting process (step S4), the laser light L to be emitted toward the core wire W1 through the slit 247 to melt the element wires W1a of the core wire W1.

Even in this case, with the method of manufacturing the terminal-attached electric wire 200 and the terminal-attached electric wire 200, similarly to the method of manufacturing the terminal-attached electric wire 100 and the terminal-attached electric wire 100, it is possible to appropriately couple the electric wire W and the terminal 1 to each other.

Note that, swaging and crimping called B-crimping as described above may be wholly applied to the conductor coupling part 244.

Figure 11:
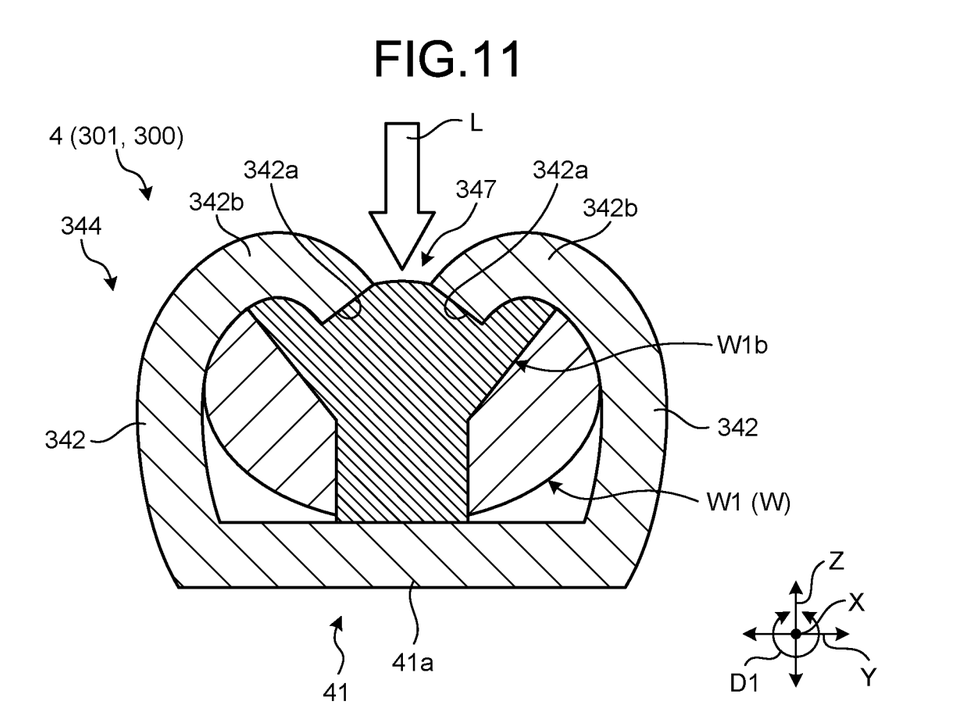
FIG. 11 is a schematic cross-sectional view for describing a method of manufacturing a terminal-attached electric wire according to a modification example.

A terminal-attached electric wire 300 according to a modification example illustrated in FIG. 11 differs from the terminal-attached electric wire 100 described above, in that a terminal 301 is provided, instead of the terminal 1. The terminal 301 differs from the terminal 1 described above, in that a conductor coupling part 344 is included, instead of the conductor coupling part 44. The conductor coupling part 344 differs from the conductor coupling part 44 described above, in that a pair of barrel pieces 342 are included, instead of the pair of barrel pieces 42. Other configurations of the terminal-attached electric wire 300, the terminal 301, and the conductor coupling part 344 are substantially similar to the configurations of the terminal-attached electric wire 100, the terminal 1, and the conductor coupling part 44 described above.

In the pair of barrel pieces 342 according to the modification example, swaging and crimping so-called B-crimping is wholly performed. In the B-crimping, in the conductor coupling part 344 according to the modification example, while the first base part 41a and the pair of barrel pieces 342 wholly wrap around and crimp the core wire W1 in the circumferential direction D1, the pair of barrel pieces 342 are each bent toward the first base part 41a. In the conductor coupling part 344, tips 342a of the pair of barrel pieces 342 are then swaged and crimped so as to each come into contact with and be pressed against the core wire W1 in this state. In the pair of barrel pieces 342 of the conductor coupling part 344 according to the modification example, in this state, the tips 342a pressed against the core wire W1 then lie at a distance in the circumferential direction D1 to form a slit 347. The slit 247 is formed as a space part sandwiched between the tips 342a of the pair of barrel pieces 342, with respect to the circumferential direction D1, to allow a space part on the interior side surrounded by the first base part 41a and the pair of barrel pieces 342 and a space part on the exterior side to be in communication with each other. The tips 342a of the pair of barrel pieces 342 pressed against the core wire W1 form fixing parts 342b. The fixing parts 342b function as parts that are bent toward the core wire W1 and come into contact with the core wire W1 to fix the core wire W1, on the side of the tips 342a of the pair of barrel pieces 342.

In this case, the operator bends, at the bending process (step S3), the pair of barrel pieces 342 to cause the pair of barrel pieces 342 to wrap around and cover the core wire W1 in the circumferential direction D1, to form the B-crimped part and to form the slit 347. The operator then causes, at the melting process (step S4), the laser light L to be emitted toward the core wire W1 through the slit 347 to melt the element wires W1a of the core wire W1.

Even in this case, with the method of manufacturing the terminal-attached electric wire 300 and the terminal-attached electric wire 300, similarly to the methods of manufacturing the terminal-attached electric wires 100, 200 and the terminal-attached electric wires 100, 200, it is possible to appropriately couple the electric wire W and the terminal 301 to each other.

For the method of manufacturing the terminal-attached electric wire and the terminal-attached electric wire according to the embodiment, the components of the embodiment and the modification examples described above may be appropriately combined with each other.

With the method of manufacturing the terminal-attached electric wire and the terminal-attached electric wire according to the present embodiment, it is possible, while the pair of barrel pieces wrap around and cover the core wire of the electric wire in the circumferential direction, to emit laser light toward the core wire through the slit formed between the pair of barrel pieces to melt the element wires of the core wire. With the method of manufacturing the terminal-attached electric wire and the terminal-attached electric wire, it is then possible to cause the element wires melted with the laser light to be bonded to the conductor coupling part of the terminal to cause the core wire and the terminal to be electrically coupled to each other. As a result, the method of manufacturing the terminal-attached electric wire and the terminal-attached electric wire exert effects of appropriately coupling the electric wire and the terminal to each other.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A method of manufacturing a terminal-attached electric wire, the method comprising:
   installing an electric wire including a core wire including a plurality of element wires having electrically conductive properties to a terminal having a base part extending in an axial direction along an axis line of the electric wire and a conductor coupling part having a pair of barrel pieces respectively extending, from both sides of the base part, in both sides in a circumferential direction around the axis line, the core wire being installed between the pair of barrel pieces;
   bending the pair of barrel pieces to cause the pair of barrel pieces to wrap around and cover the core wire in the circumferential direction to form a slit extending in the axial direction between the pair of barrel pieces, with respect to the circumferential direction;
   melting the element wires of the core wire by emitting laser light toward the core wire through the slit; and
   adhering the element wires melted with the laser light to the conductor coupling part.

2. The method of manufacturing the terminal-attached electric wire according to claim 1, wherein,
   in the pair of barrel pieces having undergone the bending, respective tip sides are bent toward the core wire, and are in contact with the core wire to form fixing parts fixing the core wire.

3. The method of manufacturing the terminal-attached electric wire according to claim 1 wherein
   the slit formed through the bending has a width in the circumferential direction, the width being equal to or narrower than an outer diameter of each of the element wires.

4. The method of manufacturing the terminal-attached electric wire according to claim 2 wherein
   the slit formed through the bending has a width in the circumferential direction, the width being equal to or narrower than an outer diameter of each of the element wires.

* * * * *